3,124,453
BRAZING ALLOY

Arthur T. Cape, Monterey, Calif., assignor to Coast Metals, Inc., Little Ferry, N.J., a corporation of Delaware
No Drawing. Filed Nov. 21, 1961, Ser. No. 154,030
2 Claims. (Cl. 75—151)

This invention relates generally to brazing alloys, but has reference more particularly to brazing alloys of the cadmium-silver type.

A well-known cadmium-silver brazing alloy is one containing 95% cadmium and 5% silver. This alloy has a strength of 11,200 pounds per square inch, in shear, as determined by pull-testing a lap joint specimen.

I have found that if very small amounts of zinc and copper are incorporated in such a cadmium-silver alloy, the shear strength of the brazing alloy can be increased to a minimum of about 15,000 pounds per square inch, and a possible maximum of 18,500 pounds per square inch.

In accordance with the invention, the brazing alloy will contain

|  | Percent |
| --- | --- |
| Silver | 4.00 to 5.8 |
| Zinc | 0.005 to 0.5 |
| Copper | 0.1 to 0.45 |
| Cadmium | Remainder |

The combined percentage of zinc and copper in the alloy may be as low as 0.2%, but should not exceed 0.55%.

A preferred alloy within the foregoing range consists of about 4.5% silver, about 0.3% zinc, about 0.2% copper, and the balance substantially all cadmium.

These percentages and ranges are exceedingly critical, as any appreciable departure therefrom will cause substantial and undesirable changes in the physical properties of the brazing alloy.

The brazing alloy may contain traces of one or more of the elements, titanium, beryllium, columbium, manganese, gold, palladium, tin, and lead, without appreciable changes in the properties of the alloy, but the total or aggregate amount of these should not exceed 0.1%. It will be understood that the phrase "the balance substantially all cadmium," as used in the specification and claims, is to be construed as including such elements in this aggregate amount.

The brazing alloy has a low melting point, i.e., about 675° F., and has an effective brazing temperature range of from about 725° F. to about 800° F.

The brazing alloy is particularly useful for brazing copper to copper, stainless steel to copper, and stainless steel to stainless steel, and is generally useful for all brazing purposes in which a low melting point, high strength, brazing material is required.

The brazing alloy is preferably made by melting the constituents of the alloy under a slag, and particularly a slag containing zinc chloride. Moreover, the best physical properties are obtained by melting the constituents of the alloy under a slag, in an argon atmosphere.

The silver is preferably added as a silver lithium alloy containing approximately 3% of lithium. Although the lithium can be added by itself, the results are not as satisfactory as when it is added as a master alloy of silver lithium. The lithium content left in the alloy is less than 0.1%. There is, naturally, a loss of lithium in the process of melting and casting the alloy.

Although the melting point of the alloy is not greatly different from that of the cadmium-silver alloy to which reference has been made, the present alloy apparently has one property which distinguishes it from said cadmium-silver alloy. This may be described as follows:

When the cadmium-silver alloy is made up into the form of a ring, and is used to braze two tubes, one of which is telescoped into the other, as by placing the ring on the end of the outer tube, the ring tends to melt and droop or fall away from the joint during the heating preliminary to the actual brazing. In contrast to this, a ring made of the present alloy remains in situ throughout the heating and does not droop or fall away.

A further advantage of the present alloy is that hard copper can be brazed with this alloy without causing a diminution in the hardness of the copper.

Having thus described my invention, I claim:

1. A brazing alloy consisting of from about 4.00% to about 5.8% silver, zinc in an amount of from about 0.005% to about 0.5%, and copper in an amount of about 0.1% to about 0.45%, the combined percentage of zinc and copper being from about 0.2% to about 0.55%, the balance of the alloy being substantially all cadmium, said alloy having a melting point of about 675° F., and a shear strength of from about 15,000 to about 18,500 pounds per square inch.

2. A brazing alloy consisting of about 4.5% silver, about 0.3% zinc, about 0.2% copper, and the balance substantially all cadmium.

References Cited in the file of this patent

UNITED STATES PATENTS

| 2,140,531 | Kennedy | Dec. 20, 1938 |
| 2,196,303 | Hensel et al. | Apr. 9, 1940 |
| 2,456,594 | Polak | Dec. 14, 1948 |

OTHER REFERENCES

Metals and Alloys, by The Technical Staff of Metal Industry Chemical Publishing Co., Brooklyn, New York, 1950, page 65 relied on.